United States Patent
Hippenmeyer et al.

[11] Patent Number: 6,021,946
[45] Date of Patent: Feb. 8, 2000

[54] SELF-FOCUSING BAR CODE READER AND OPTICAL RECEIVING SYSTEM

[75] Inventors: Heinrich Hippenmeyer, Freiamt; Hans-Werner Pierenkemper, Emmendingen; Wolfram Runge, Freiburg, all of Germany

[73] Assignee: Sick AG, Waldkirch, Germany

[21] Appl. No.: 09/042,186

[22] Filed: Mar. 13, 1998

[30] Foreign Application Priority Data

Mar. 14, 1997 [DE] Germany .............. 197 10 724

[51] Int. Cl.$^7$ .................................................. G06K 7/10
[52] U.S. Cl. ............. 235/462.22; 250/568; 250/201.2; 250/252; 235/462.35; 235/462.23; 235/460
[58] Field of Search ................. 250/568, 201.2, 250/252; 235/462.22, 462.35, 462.23, 460

[56] References Cited

U.S. PATENT DOCUMENTS

| | | | |
|---|---|---|---|
| 4,818,886 | 4/1989 | Drucker | 250/566 |
| 4,831,275 | 5/1989 | Drucker | 250/566 |
| 4,877,949 | 10/1989 | Danielson et al. | 235/462 |
| 5,386,105 | 1/1995 | Quinn et al. | 235/462 |
| 5,438,187 | 8/1995 | Reddersen et al. | 235/462 |
| 5,473,149 | 12/1995 | Miwa et al. | 235/472 |
| 5,550,367 | 8/1996 | Plesko | 235/472 |
| 5,565,668 | 10/1996 | Reddersen et al. | 235/462 |
| 5,641,958 | 6/1997 | Rudeen | 250/235 |

FOREIGN PATENT DOCUMENTS

0517956A1  12/1992  European Pat. Off. .

*Primary Examiner*—Thien M. Le
*Assistant Examiner*—Daniel S. Felton
*Attorney, Agent, or Firm*—Townsend and Townsend and Crew LLP

[57] ABSTRACT

The invention relates to an optoelectronic sensor, in particular a bar code reader, with an optical receiving system positioned in front of a light receiver for the deflection of a light beam reflected from an object, in particular a bar code, onto the light receiver. Through the provision of aperture diaphragms, or a plurality of light receivers, or regions with different image forming characteristics in the optical receiving system, a situation is achieved in which the receiving characteristics of the overall system, which result by reason of the shape of the sensing laser beam, as a result of the characteristics of the electronic evaluation system and as a result of different light intensities of the light returned, for example from a bar code, are optimized for different sensing distances.

14 Claims, 4 Drawing Sheets

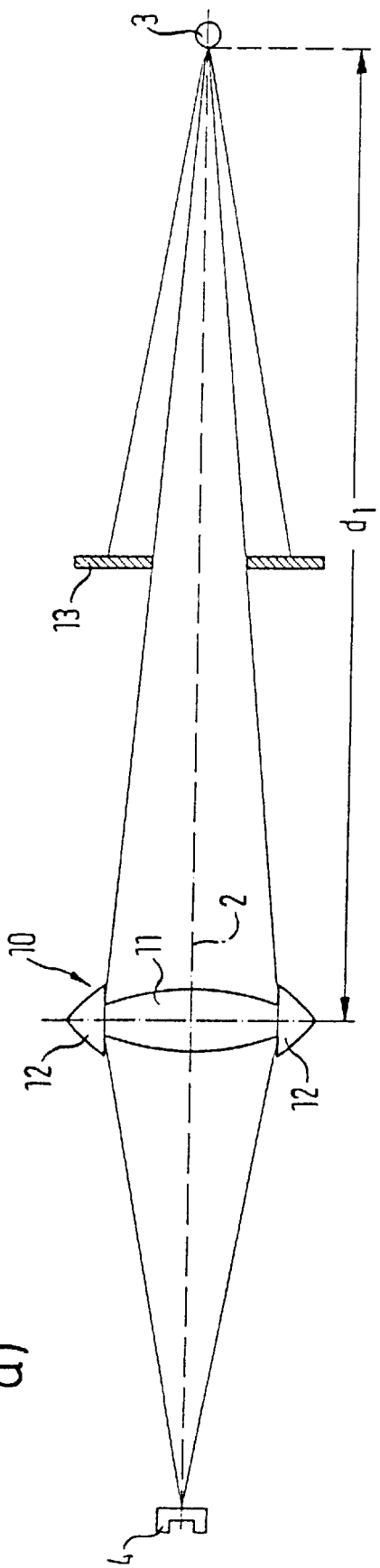
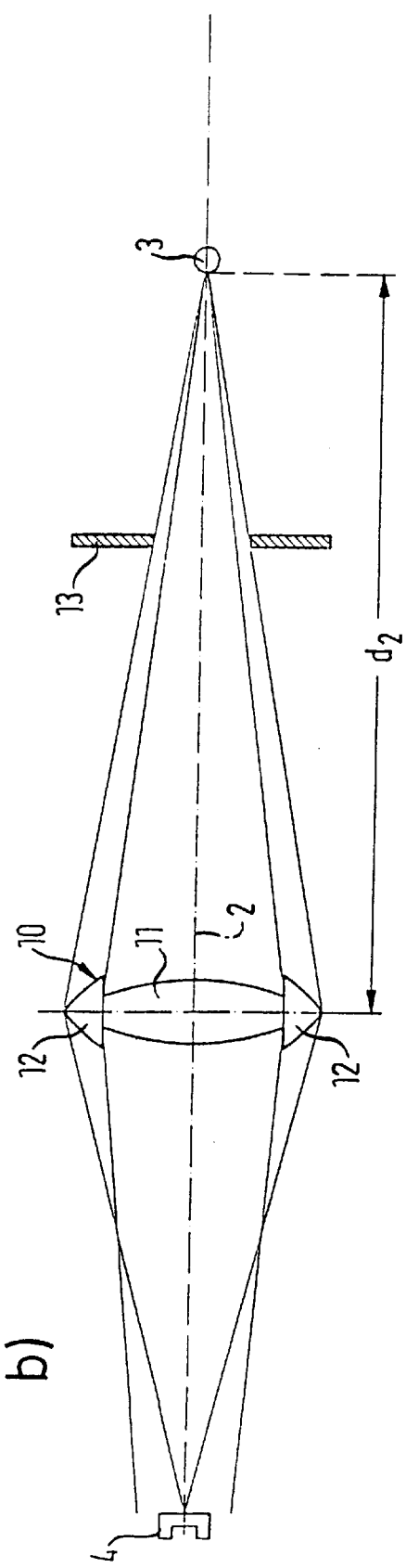
FIG. 3

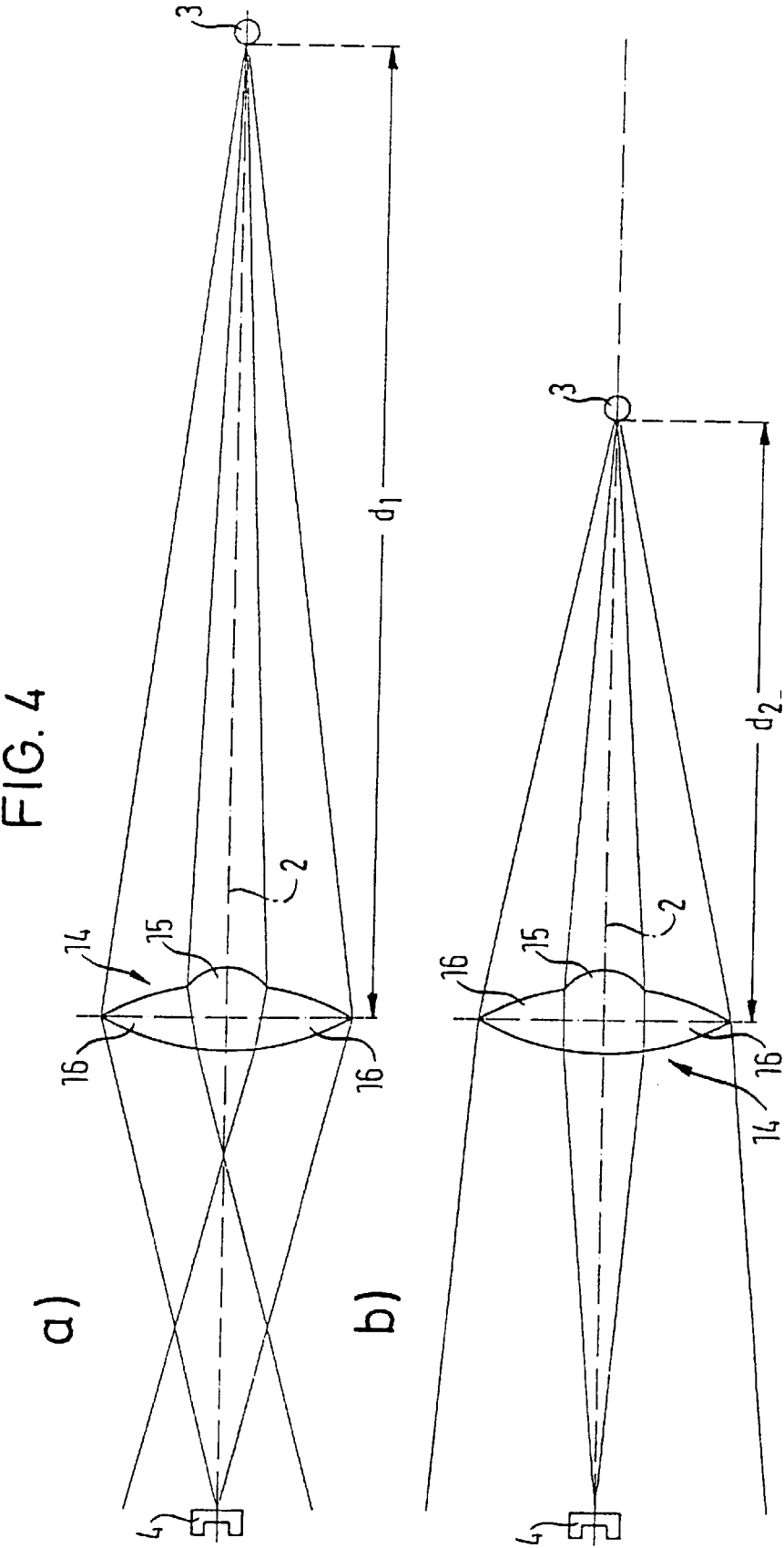

SELF-FOCUSING BAR CODE READER AND OPTICAL RECEIVING SYSTEM

FIELD OF THE INVENTION

The invention relates to an optoelectronic sensor, in particular to a bar code reader, with an optical receiving system placed in front of a light receiver for the focusing of a light beam reflected from an object, in particular from a bar code, onto the light receiver.

DESCRIPTION OF THE PRIOR ART

In such optoelectronic sensors a problem exists in as much as the object, which reflects transmitted light to the light receiver, can be located at different scanning distances relative to the sensor, whereby respective, correspondingly different, image forming conditions result.

Different scanning distances in particular bring about changes of the electrical current delivered by the light receiver. With non-variable size of the inlet pupil of the sensor responsible for the received light, the current delivered by the light receiver changes approximately with the inverse value of the square of the scanning distance.

In this respect, different scanning distances bring about correspondingly different light bead sizes on the light receiver, with the size of the light bead growing with reducing scanning distance.

The above described dependencies between the scanning distance and the light flux, or between the scanning distance and the size of the light bead, result in disadvantageous manner in a non-uniform transmission behavior of the sensor, i.e. of the light receiver, whereby the signal processing and evaluation of the signals delivered by the light receiver is made more difficult.

OBJECT OF THE INVENTION

An object of the invention is to further develop an optoelectronic sensor of the initially named kind in such a way that the transmission behavior of the total sensor system, i.e. of the light receiver, is improved. In particular, it should be ensured that a change of the scanning distance does not have a negative effect on the quality of the signals delivered by the light receiver, or of the signal processing which takes place in the sensor, and that the useful light component received by the light receiver is sufficiently high, in particular also with short scanning distances, to enable a reliable and high quality signal processing.

BRIEF DESCRIPTION OF THE INVENTION

In order to satisfy the above-named object, three suggestions for a solution are proposed in accordance with the invention:

In accordance with the first proposal for a solution, an aperture diaphragm is provided between the optical receiving system and the light receiver and has an active region at least for light reflected from objects located substantially at a remote position relative to the optical receiving system.

Through the provision of the named aperture diaphragm a situation is achieved in which at small scanning distances, i.e. with an increased size of the light bead, only a proportion of the reflected light restricted by the said active region reaches the light receiver because that proportion of the reflected light which corresponds to the region of the light bead which falls outside of the active region of the aperture diaphragm onto the aperture diaphragm is stopped. Thus, an undesired increase of the light flux as a result of an increased size of the light bead is avoided.

It is expedient when the active region of the aperture diaphragm or the aperture of the diaphragm is arranged such that, for objects located substantially at a remote position relative to the optical receiving system, at least substantially all the light which is reflected by the object and is incident through the inlet pupil reaches the light receiver. The action of the aperture diaphragm thus first arises in this case when the reflecting object moves closer to the sensor and the light bead size is thereby increased.

Different transmission characteristics can be set by intentional matching of the size of the active region, i.e. of the size of the diaphragm opening, of the focal length of the optical receiving system, and also of the spacing of the reflecting object from the aperture diaphragm.

Furthermore, a situation is achieved in accordance with the invention in which the receiving characteristics of the total system, which result from the shape of the scanning light beam, as a result of the characteristics of the electronic evaluation system, and as a result of different light intensities of the light which is, for example, reflected back from a bar code, are optimized.

A particularly good action of the aperture diaphragm provided in accordance with the invention can be achieved when the diaphragm is arranged closer to the light receiver than to the optical receiving system, or when the aperture diaphragm is arranged directly adjacent to the light receiver. With a small distance between the light receiver and the aperture diaphragm, the size of the light bead, which reaches the receiver, can be kept almost completely constant over a large range of scanning distances.

With very small scanning distances, a situation can arise in which, through the provision of the diaphragm of the invention, ultimately too little light reaches the receiver because the light intensity per unit of area drops off when the size of the light bead is correspondingly greatly increased as a result of a greatly reduced scanning distance. In this case, in order to increase the light component which falls on the receiver, the diaphragm can have a first active region for light reflected from objects located substantially at a remote position relative to the optical receiving system, and at least a second active region for light reflected from objects located between the remote position relative to the optical receiving system and the optical receiving system.

The second active region is so arranged that light only passes through it at small scanning distances, while the first active region is so arranged that it transmits substantially all the light reflected from an object located at the remote position. The first active region is thus located at all scanning distances in the region of the received light bead, while the second active region is only embraced by a greatly enlarged light bead resulting from a consequently reduced scanning distance. The second active region thus brings about a situation in which, at small scanning distances, light additionally reaches the receiver in order to increase the light flux in this way in desired manner.

The two active regions can, for example, be formed as two separate diaphragm slots which are in particular of different sizes. In just the same way it is, however, also possible for the two active regions to be components of a single diaphragm aperture which can have different contours, with it being possible to set the respectively desired transmission characteristics by the selection of different contours.

In accordance with the second proposal for a solution in accordance with the invention the light receiver unit has a first light receiver for light reflected from objects located substantially at a remote position relative to the optical receiving system, and at least one second light receiver for light reflected from objects located between the remote position relative to the optical receiving system and the optical receiving system.

The two light receivers provided in accordance with the invention can be arranged such that their manner of operation substantially corresponds to the two active regions of the above described aperture diaphragm, i.e., for example, for reflecting objects located substantially at the remote position, so that the first light receiver receives at least a large part of the reflected light, while the second light receiver in this case receives substantially no light. For a reduced scanning distance, the received light bead then increases in size such that light is received by the two light receivers, whereby the light flux is enhanced in desired manner at short scanning distances.

For the two or more light receivers proposed in accordance with the second variant of the solution, the transmission characteristic of the sensor can, for example, be set in the respectively desired manner by an intentional choice of the sizes of the light sensitive areas of the light receivers or by the provision of light receivers with different sensitivities.

An advantage in the provision of two or more light receivers is to be seen in the fact that for the evaluation of the received signal, not only the photocurrent of a single light receiver, but rather a plurality of signals, i.e. the photocurrents of two or more light receivers are available.

As a consequence the signals delivered for example from the different light receivers can be differentially weighted by means of a suitable evaluation unit, whereby the receiving characteristic of a sensor in accordance with the invention can be intentionally set.

Moreover, it is possible for the distance between the reflecting object and the sensor to be determined by means of a suitable evaluation unit on the basis of the signals delivered from the light receivers. This is possible because, with the provision of the two or more sensors, the position and/or size of the received light bead can be determined from which conclusions can be drawn regarding the said distance.

In the event of determination of the distance between the reflecting object and the sensor, this distance information can be used to correspondingly set a focusing device for the transmitted beam, and thus to match this to the distance which has been found. In this way, ideal image forming characteristics can be achieved with respect to the sharpness of the scanning light point.

It is preferred when the focal distance of the optical receiving system set in this way is taken into account in the evaluation of the signals delivered by the light receivers.

In accordance with the third proposal for a solution in accordance with the present invention, the optical receiving system is formed in such a way that it has a first region for the imaging of objects located substantially at a remote position relative to the optical receiving system, and at least a second region for the imaging of objects located between the remote position relative to the optical receiving system and the optical receiving system, with both regions having different imaging forming characteristics from one another.

In the development of this proposal for a solution it was recognized that the actually used region of the optical receiving system changes in dependence on the scanning distance, i.e. in dependence on the size of the received light bead. In accordance with the invention one exploits this effect, inasmuch as different regions of the optical receiving system are provided with different image forming characteristics, with certain regions only being active for certain sensing distances.

As a rule, for a small sensing distance, a larger region of the optical receiving system is used than for a larger sensing distance. Accordingly, this enlarged region that is used can also be exploited, through the provision of corresponding image forming characteristics, to direct more light onto the light receiver at small scanning distances, in order in this way to increase the light flux at small scanning distances in the desired manner.

The regions of the optical receiving system having different image forming characteristics can be formed by a single lens or by a plurality of lenses and by the provision of different focal lengths and/or different inclined positions of optical components of the optical receiving system.

The invention is not restricted to the provision of only two regions with different image forming characteristics. A plurality of regions can quite generally be provided each having different image forming characteristics.

It is advantageous when two regions are arranged within a single lens, at least substantially concentric to one another. In this case, a central region of the lens results with a first image forming characteristic and the ring region surrounding this central region has image forming characteristics which differ from the first image forming characteristics.

In this case, the inner region of the lens can, for example, be designed to form an image of the objects located substantially at the remote position relative to the optical receiving system, and the outer region can be designed to form an image of objects located between the remote position relative to the optical receiving system and the optical receiving system. Because the outer region is effective at shorter scanning distances, which arise with objects located between the remote position relative to the optical receiving system and the optical receiving system, as a consequence of an enlarged received light bead, the inner region of the optical receiving system is in these cases always active, so that the outer region ultimately results in a situation in which not only light from the inner region, but rather additionally also light from the outer region is deflected onto the light receiver.

BRIEF DESCRIPTION OF THE DRAWINGS

FIGS. 3a–3b are schematic diagrams illustrating the principle of the receiver region of an optoelectronic sensor in accordance with the third variant of the solution of the invention for two different sensing distances (first alternative), and FIGS. 4a–4b are a schematic diagrams illustrating the principle of the receiver region of an optoelectronic sensor in accordance with the third variant of the solution of the invention for two different sensing distances (second alternative).

DESCRIPTION OF THE PREFERRED EMBODIMENT

Figure 1:
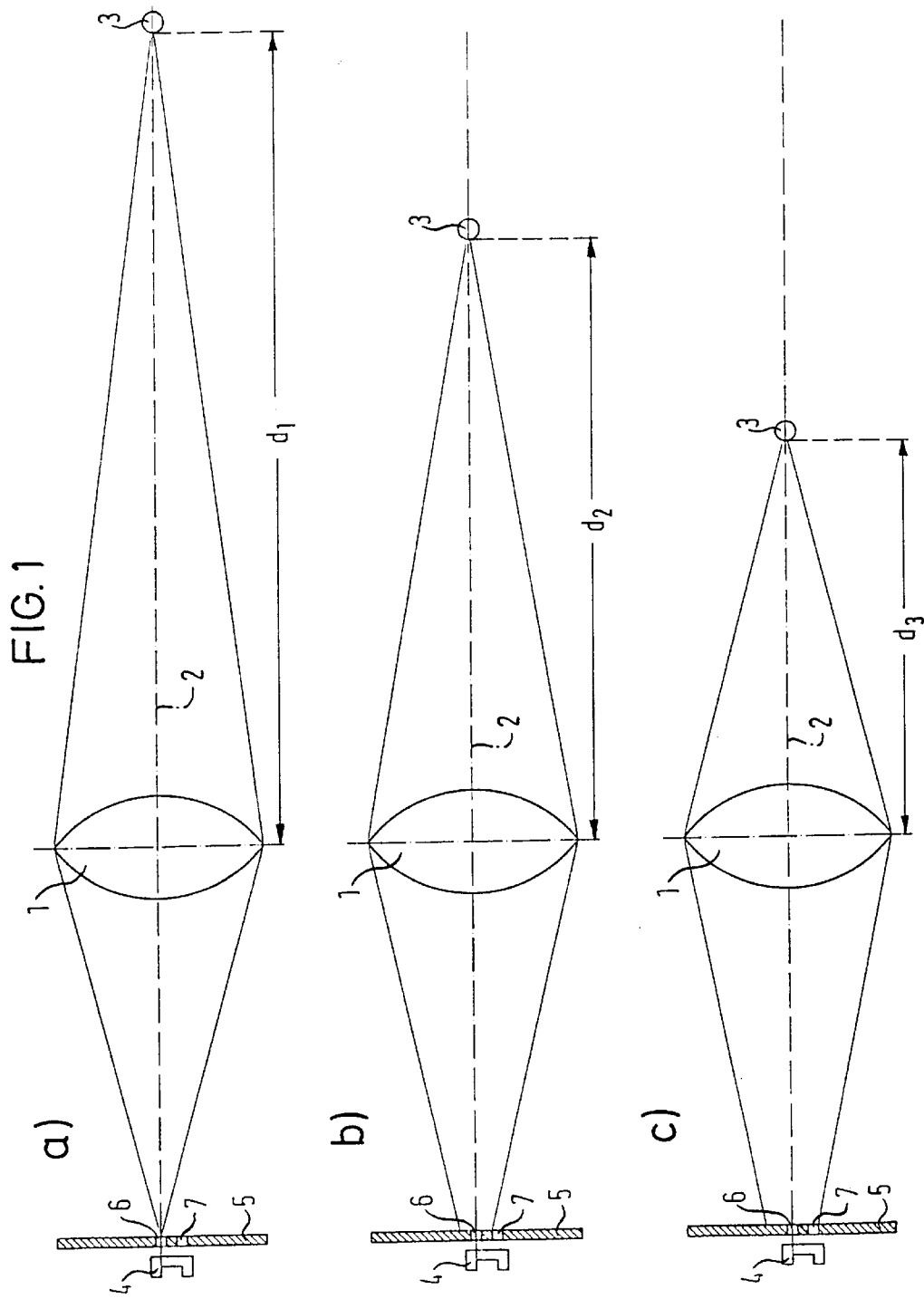
FIGS. 1a–c are schematic diagrams illustrating of the principle the receiver region of an optoelectronic sensor in accordance with the first variant of the solution of the invention for three different sensing distances.

FIG. 1a shows in schematic side view a convergent lens 1 with a horizontally extending axis 2 on which a reflecting object 3 is located at a distance $d_1$ from the convergent lens 1.

The distance $d_1$ corresponds to the remote position of the receiver arrangement shown in FIG. 1a.

A light receiver 4 is provided at the side of the collecting lens 1 remote from the object 3 and is suitable to convert the received light into an electrical current.

An aperture diaphragm 5 is provided directly adjacent the light receiver 4 between the collecting lens 1 and the light receiver 4 and has two separate diaphragm slots 6 and 7.

The diaphragm slots 6 and 7 are thereby arranged such that when an object 3, as shown in FIG. 1a, is located at the remote position received light passes at least substantially fully through the diaphragm slot 6 and reaches the light receiver 4 in this manner. In this case, no light passes through the second diaphragm slot 7.

If now the reflecting object is moved closer to the optical receiving system or closer to the convergent lens 1, and is for example located at the distance $d_2$ relative to the convergent lens 1 shown in FIG. 1b, then the size of the light bead imaged onto the diaphragm 5 increases. In particular, the light bead in this case becomes greater than the free passage area of the diaphragm slot 6. However, the light bead is not yet so large that it reaches the region of the second diaphragm slot 7.

In the position of the reflecting object 3 illustrated in FIG. 1b, the diaphragm 5 develops its action to the extent that a part of the reflected light is stopped and does not reach the light receiver 4.

In this manner, a situation is achieved in which the size of the light bead on the light receiver 4 is substantially unchanged in the two positions in accordance with FIGS. 1a and 1b.

In the illustration of FIG. 1c, the reflecting object 3 is located at the distance $d_3$ from the convergent lens 1, with $d_3$ being reduced relative to $d_2$ (FIG. 1b).

This reduction of the distance between the convergent lens 1 and the reflecting object 3 leads to a further increase in the size of the light bead imaged onto the diaphragm 5. The light bead of FIG. 1c imaged onto the diaphragm 5 is so large that is covers over both the diaphragm slot 6 and also the diaphragm slot 7, so that light passes through both diaphragm slots 6, 7 onto the light receiver 4.

In the position of FIG. 1c, additional light is thus directed through the diaphragm slot 7 onto the light receiver 4, whereby the electrical current delivered by the light receiver 4 is increased in order to compensate in this way for the reduced light intensity per unit of area resulting from the increased size of the light bead.

FIG. 2a shows an embodiment in accordance with the second variant of the solution of the invention in which, in distinction to FIG. 1, two light receivers 8, 9 are provided alongside one another in place of the aperture diaphragm 5.

In the illustration of FIG. 2a, the reflecting object 3 is again located at the remote position relative to the receiving arrangement 1, 8, 9. In this arrangement at least the important component of the light reflected from the reflecting object 3 is directed onto the first light receiver 8. The light receiver 9 receives no light in this case.

If now the sensing distance is reduced from $d_1$ in accordance with FIG. 2a to $d_2$ in accordance with FIG. 2b, then the size of the light bead of the received light increases in size such that the light receiver 8 of FIG. 2b is fully illuminated by the enlarged light bead. The light receiver 9 still receives no light.

Through further reduction of the sensing distance from $d_2$ in accordance with FIG. 2b to $d_3$ in accordance with FIG. 2c, a further enlargement of the received light bead occurs, so that finally the second light receiver 9 is also illuminated with received light.

In accordance with FIG. 2c, the two light receivers 8, 9 are acted on by the received light, so that in this manner the sum of the electrical currents delivered by the two light receivers 8, 9 is increased in desired manner.

The two electrical currents delivered by the light receivers 8, 9 can be advantageously evaluated in a different manner, as was already explained above.

Figure 2:
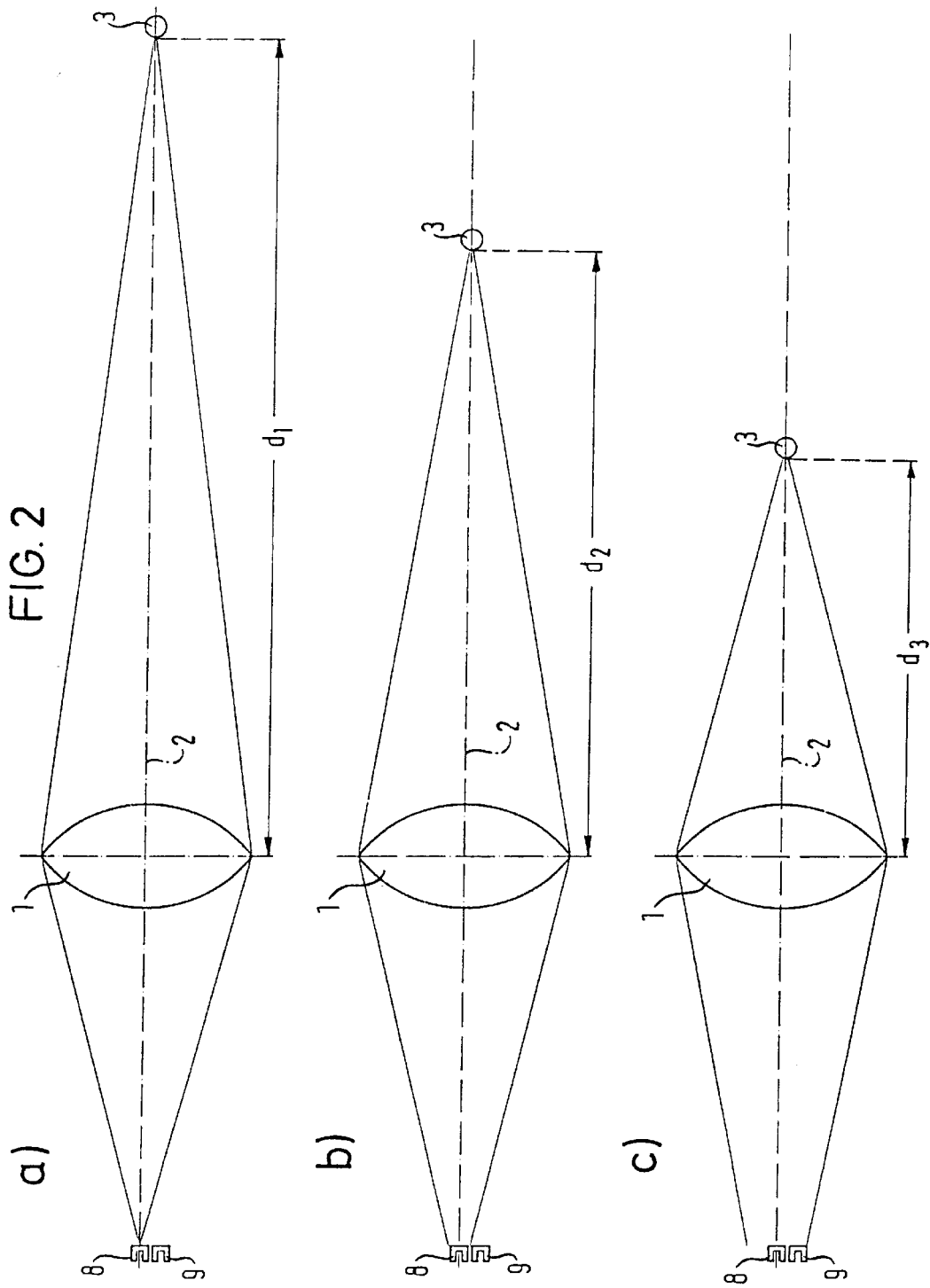
FIGS. 2a–2c are a schematic diagrams illustrating the principle of the receiver region of an optoelectronic sensor in accordance with the second variant of the solution of the invention for three different sensing distances.

As an alternative to the arrangement shown in FIG. 2, it is also possible to move the two light receivers 8, 9 further apart from one another in the direction perpendicular to the optical axis. In this case, a diaphragm action can be achieved with respect to the light receiver 8, when the light bead is larger than the active receiving area of the light receiver 8, but not yet so large that the light receiver 9 is also illuminated.

FIG. 3 shows an arrangement in accordance with the third variant of the solution of the invention.

In accordance with FIG. 3a, a collecting lens 10 is provided which has an inner region 11 with a first focal length and an outer region 12 with the second focal length. The focal length of the outer region 12 is shorter than the focal length of the inner region 11. The two regions 11, 12 are arranged concentric to one another.

A reflecting object 3 is present on the optical axis 2 at a distance $d_1$ (remote position) relative to the collecting lens 10. A diaphragm 13 is arranged approximately in the middle between the reflecting object 3 and the collecting lens 10, with its diaphragm opening being positioned such that for an object 3 located at the distance $d_1$ relative to the lens 10 only the inner region 11 of the lens 10 is illuminated with received light. Light which would illuminate the outer region 12 is stopped by the diaphragm 13.

At the side of the lens 10 remote from the object 3 there is provided a light receiver 4 onto which the light which passes through the inner region 11 of FIG. 3a is focused.

If now the reflecting object 3 is moved closer to the optical receiving system 12, 13, i.e. if the sensing distance is shortened to $d_2$ in accordance with FIG. 3b, the entire light reflected from the object 3 passes through the diaphragm slot of the diaphragm 13 onto the lens 10 and here both the inner region 11 and also the outer region 12 are illuminated with received light. In this arrangement the outer region 12 focuses the light directed to it onto the light receiver 4. In addition, light naturally also reaches the light receiver 4 through the inner region 11, with the light bead generated by the inner region 11 being enlarged in the plane of the light receiver 4 relative to the position of FIG. 3a.

For the sensing distance $d_2$ in accordance with FIG. 3b, the outer region 12 of the lens thus causes additional light to reach the light receiver 4, whereby the light flux is increased in the desired manner when the sensing distance is reduced to $d_2$.

FIG. 4 shows an alternative arrangement to FIG. 3 in which a lens 14 with an optical axis 2 is provided which likewise has an inner region 15 and an outer region 16 which are arranged concentric to one another.

In this case, however, the inner region 15 has a smaller focal length than the outer region 16.

With the sensing distance $d_1$ between the object 3 and the lens 14 shown in FIG. 4a, the reflected light passing through the outer region 16 is focused onto the light receiver 4. Only a small part of the light passing through the inner region 15 reaches the light receiver 4.

When the sensing distance $d_2$ is reduced in accordance with FIG. 4b relative to FIG. 4a, the light passing through the inner region 15 is focused onto the light receiver 4, and only a part of the light which passes through the outer region 16 now reaches the light receiver 4.

By an appropriate choice of the focal length of the inner and outer regions 15 and 16, intentional transmission characteristics can be set for the receiver part of a sensor in accordance with the invention.

1 convergent lens
2 optical axis
3 object
4 light receiver
5 aperture diaphragm
6 diaphragm slot
7 diaphragm slot
8 light receiver
9 light receiver
10 convergent lens
11 inner region
12 outer region
13 aperture diaphragm
14 convergent lens
15 inner region
16 outer region

What is claimed is:

1. An optoelectronic sensor for sensing light reflected from an object, the optoelectronic sensor comprising:
   a light receiver;
   an optical receiving system disposed between the light receiver and the object for focusing a light beam reflected from the object onto the light receiver; and
   an aperture diaphragm disposed between the optical receiving system and the light receiver, the aperture diaphragm having a first active region for light reflected from an object located substantially at a remote position relative to the optical receiving system and at least one further active region for light reflected from an object located between the optical receiving system and the remote position relative to the optical receiving system.

2. An optoelectronic sensor in accordance with claim 1 wherein the aperture diaphragm is arranged closer to the light receiver than to the optical receiving system.

3. An optoelectronic sensor in accordance with claim 2 wherein the aperture diaphragm is arranged directly adjacent the light receiver.

4. An optoelectronic sensor in accordance with claim 1 wherein two active regions are formed as two separate diaphragm slots in the aperture diaphragm.

5. An optoelectronic sensor in accordance with claim 4 wherein the two diaphragm slots are of different sizes.

6. An optoelectronic sensor in accordance with claim 4 wherein the two diaphragm slots are spaced in a direction which is perpendicular to an axis along which the aperture diaphragm, the optical receiving system, and the object are aligned.

7. An optoelectronic sensor in accordance with claim 1 wherein two active regions are elements of a single diaphragm aperture in the aperture diaphragm.

8. An optoelectronic sensor for sensing light reflected from an object, the optoelectronic sensor comprising:
   a light receiving unit; and
   an optical receiving system disposed between the light receiving unit and the object for focusing a light beam reflected from the object onto the light receiving unit,
   wherein the light receiving unit includes a first light receiver for light reflected from an object located substantially in a remote position relative to the optical receiving system, and at least one further light receiver for light reflected from an object located between the optical receiving system and the remote position relative to the optical receiving system, the light receivers having different sensitivities.

9. An optoelectronic sensor for sensing light reflected from an object, the optoelectronic sensor comprising:
   a light receiving unit;
   an optical receiving system disposed between the light receiving unit and the object for focusing a light beam reflected from the object onto the light receiving unit, wherein the light receiving unit includes a first light receiver for light reflected from an object located substantially in a remote position relative to the optical receiving system, and at least one further light receiver for light reflected from an object located between the optical receiving system and the remote position relative to the optical receiving system; and
   an evaluation unit for evaluating signals delivered from the light receivers.

10. An optoelectronic sensor in accordance with claim 9 wherein the evaluation unit is configured for differential weighting of the signals delivered from the light receivers to achieve defined receiving characteristics.

11. An optoelectronic sensor in accordance with claim 10 wherein the evaluation unit is configured for adjustable weighting of the signals delivered from the light receivers.

12. An optoelectronic sensor in accordance with claim 10 wherein the evaluation unit is configured for determination of the spacing between the object and the sensor based on the signals delivered from the light receivers.

13. An optoelectronic sensor in accordance with claim 12 further comprising a focusing device for a transmitted beam, the focusing device being activatable in dependence on the distance between the object and the sensor.

14. An optoelectronic sensor in accordance with claim 9 wherein the light receiving unit includes two light receivers.

* * * * *